United States Patent [19]

Isono et al.

[11] 4,130,831
[45] Dec. 19, 1978

[54] COLOR TELEVISION CONTROL CIRCUIT FOR USE WITH A VIR SIGNAL

[75] Inventors: Katsuo Isono, Kawagoe; Seiji Sanada, Yokosuka, both of Japan

[73] Assignee: Sony Corporation, Tokyo, Japan

[21] Appl. No.: 753,868

[22] Filed: Dec. 23, 1976

[30] Foreign Application Priority Data

Dec. 26, 1975 [JP] Japan ................ 50/157204

[51] Int. Cl.² ........................... H04N 9/535
[52] U.S. Cl. ....................... 358/27; 358/28
[58] Field of Search ................ 358/27, 28, 10

[56] References Cited

U.S. PATENT DOCUMENTS

| | | | |
|---|---|---|---|
| 3,368,030 | 2/1968 | Wiencek | 358/27 |
| 3,673,320 | 6/1972 | Carnt | 358/19 |
| 3,679,816 | 7/1972 | Avins | 358/28 |
| 3,780,218 | 12/1973 | Rennick | 358/28 |
| 3,950,780 | 4/1976 | Freestone | 358/28 |

OTHER PUBLICATIONS

Ge's "Broadcast-Controlled" Color System–Part 2, *Electronic Technican/Dealer*, Sep. 1976, pp. 20–29.

*Primary Examiner*—John C. Martin
*Attorney, Agent, or Firm*—Lewis H. Eslinger; Alvin Sidnerbrand

[57] ABSTRACT

Color television receiving apparatus for receiving and demodulating a composite color television signal including hrozintal synchronizing signals, color burst signals, and luminance and chrominance components. This composite color television signal is of the type which additionally may or may not include a VIR signal which, typically, is broadcasted in a predetermined line interval during the vertical retrace period of the composite color video signal. The apparatus includes the demodulator for demodulating the chrominance component, which has been separated from the composite video signal, into its color signal components. A signal generator generates a signal, such as a gate signal, during the predetermined line interval in which the VIR signal is expected. Control circuitry is energized by this generated signal to respond to selected components produced by the demodulator during the line interval in which the VIR signal is provided for producing signals which are used to control the color signal components demodulated by the demodulator, such as to control the hue and saturation of such demodulated components. Manually operable adjusting circuitry is coupled to the control circuitry for selectively varying the control signals in accordance with an operator's particular preference for hue and/or saturation characteristics of the reproduced color video picture. In one embodiment, switching circuitry is provided to selectively energize the control circuitry either with the aforementioned generated gate signal or, in the event that the transmitted video signal is not provided with a VIR signal, with an alternative periodic gating signal, such as a signal derived from the horizontal sync signal.

11 Claims, 3 Drawing Figures

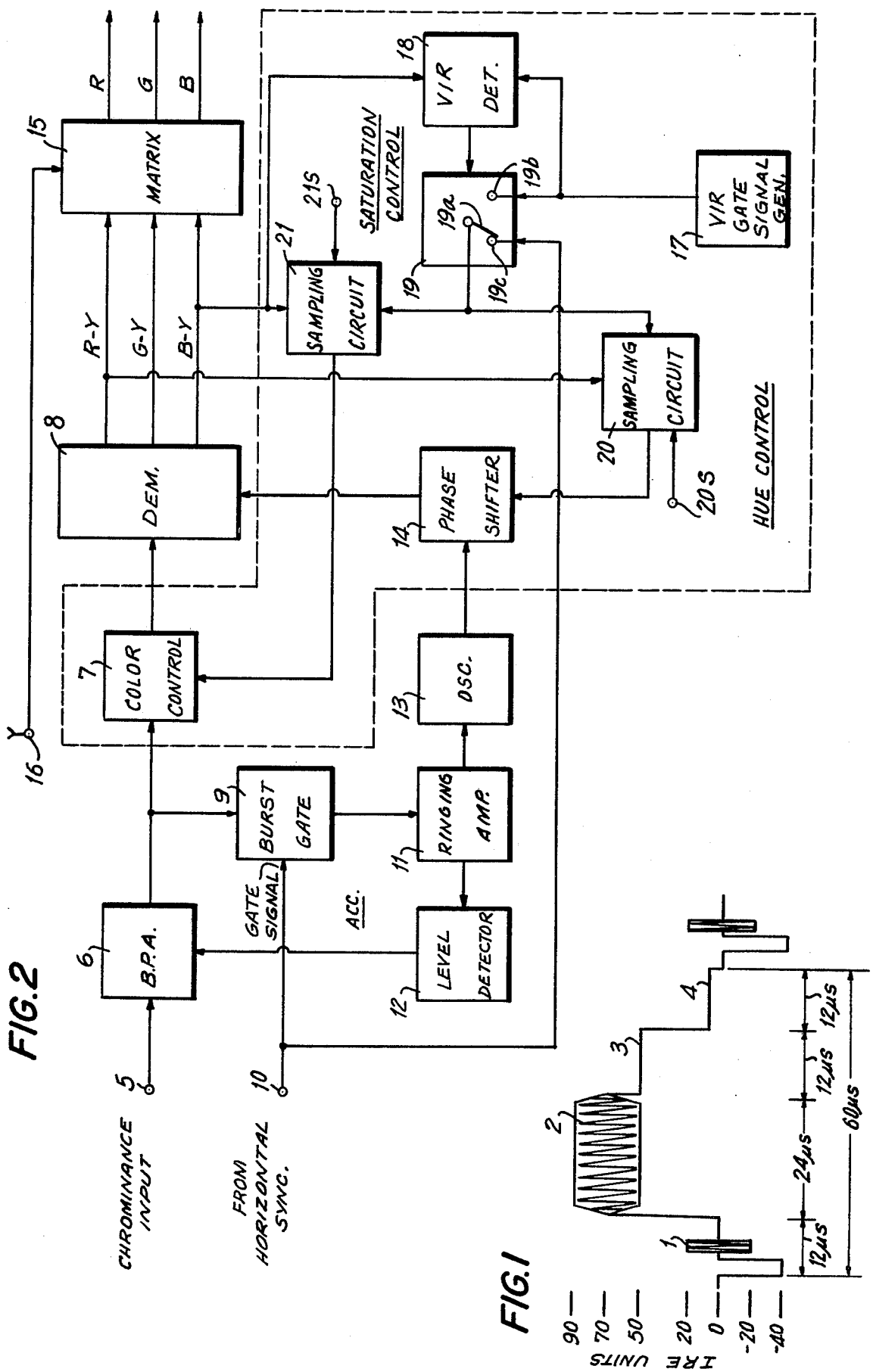

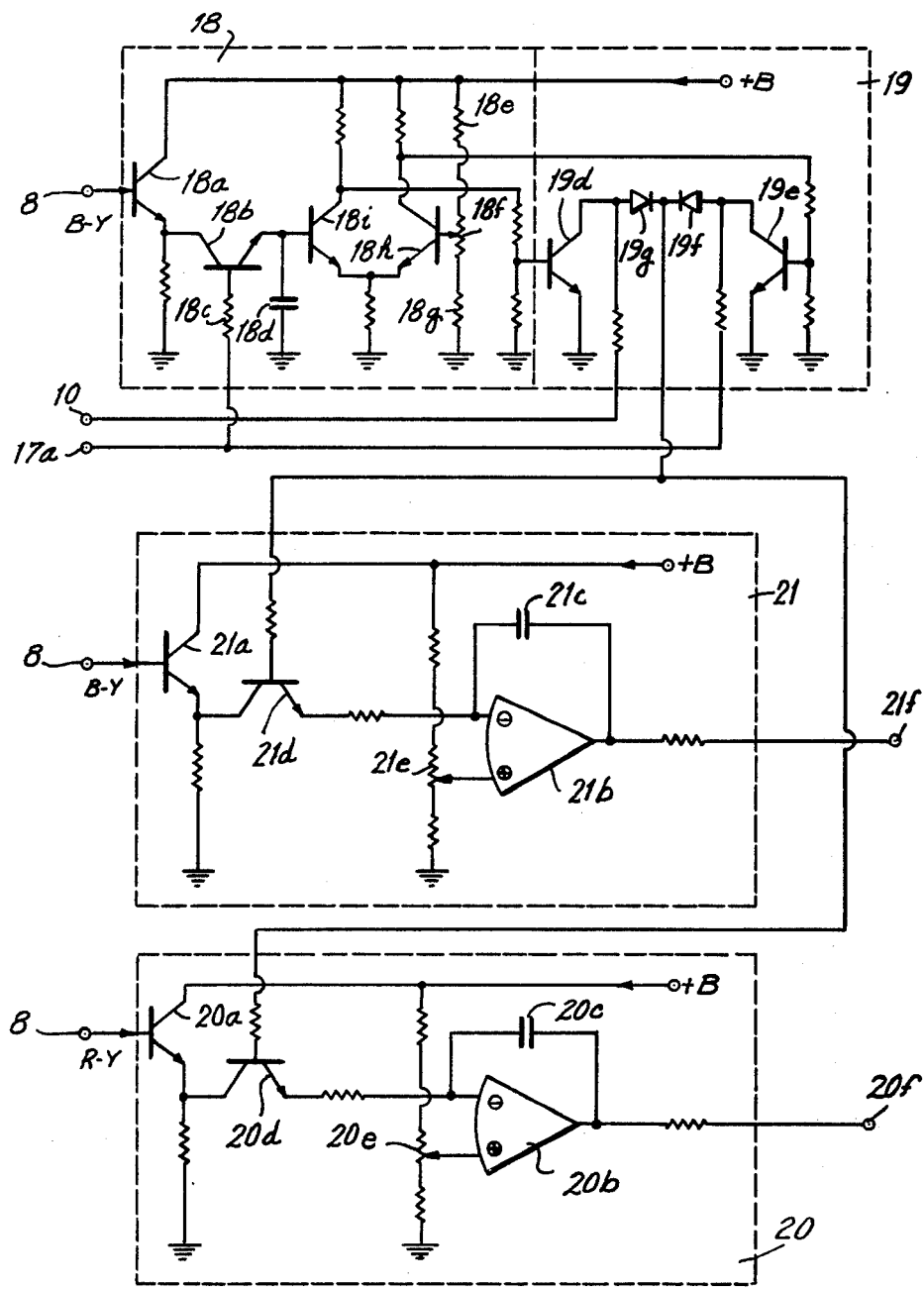

COLOR TELEVISION CONTROL CIRCUIT FOR USE WITH A VIR SIGNAL

BACKGROUND OF THE INVENTION

This invention relates to color television receiving apparatus and, more particularly, to improvements in such apparatus whereby the color characteristics of a reproduced color video picture are controlled in accordance with a transmitted reference signal, such automatic control also being subjected to manual adjustment.

In a conventional NTSC composite color television signal, monochrome information, that is, the brightness information of the video picture, is transmitted by the luminance signal and the color information is transmitted by the chrominance signal. This chrominance information is amplitude modulated onto a subcarrier, and different color information components are modulated onto different phases of the subcarrier. The composite color video signal also includes periodic horizontal synchronizing signals and color burst signals which are used at the television receiver to control a local oscillator such that its frequency and phase are synchronized with that of the burst signal. For this purpose, the color burst signal is formed of approximately eight cycles of the color subcarrier which is superimposed onto the pedestal level during the horizontal synchronizing interval of the video signal. The composite video signal also includes vertical synchronizing information which is present during a number of horizontal line intervals that form the vertical retrace interval.

As aforementioned, the purpose of the color burst signal is to synchronize a local oscillator in a color television receiver so that the local oscillator output can be used to demodulate the received chrominance component with sufficient fidelity such that the reproduced color video picture is an accurate image of the original transmitted picture. However, a transmitted composite color video signal may be subjected to various phase and/or amplitude distortions. Such distortions may be derived directly at the transmitting site or may be attributed to the signal transmission path. Although the purpose of the burst signal is to permit the local oscillator at a color television receiver to match or track such distortions, there is the possibility that the burst signal and modulated color subcarriers may be subjected to different distortions. That is, since the burst signal is provided on the pedestal level and the color-modulated subcarrier is provided on quite different levels, the amplitude and phase distortion at the pedestal level might differ from such distortion at the other level. Consequently, even though this distortion in the burst level can be detected and corrected, such correction may not fully account for the distortions in the subcarrier at the other level.

One proposal to minimize distortion in the subcarrier which may not be fully corrected by synchronizing the local oscillator at the television receiver to the received burst signal is to provide a further reference signal in the transmitted composite color video signal. This reference signal is known as the vertical interval reference signal, or VIR signal, and is formed of a reference subcarrier, equal in frequency and phase to the burst signal, transmitted during a selected portion of the vertical retrace interval. It has been suggested that this VIR signal can be transmitted during the nineteenth or twentieth horizontal line interval which, as is known, is included in the vertical retrace interval. Essentially, this subcarrier reference signal differs from the burst signal in that is exists for a longer duration and is superimposed on a level other than the pedestal level.

It is expected that, when a transmitted video signal having the VIR signal is received, the reference information provided by the VIR signal can be used to control the color television receiving apparatus such that the reproduced color picture exhibits optimum color characteristics. That is, this VIR signal can be used to control the phase of the local oscillator which, as is known, determines the hue or tint of the color picture. Also, the information provided by this VIR signal can be used to control the level of the received chrominance component which, as is known, controls the saturation of the reproduced color picture. Therefore, by automatically controlling the local oscillator phase and chrominance component level in accordance with optimum standards, such as the NTSC standard, as represented by the VIR signal, a correspondingly optimum color video picture can be reproduced.

Although an optimum color picture can be reproduced so as to conform with predetermined standards, it is quite possible that a television viewer might have certain preferences which differ from the standard characteristics. That is, the particular hue and saturation characteristics of the reproduced optimum picture might not conform to the viewer's particular preferences. However, in proposed color television receiving apparatus which utilizes the VIR signal for controlling the color characteristics in the reproduced picture, no provision is made to enable a viewer to selectively adjust the hue or saturation so that the picture differs from the optimum picture. Another disadvantage of some proposed VIR-responsive color television receiving apparatus is that the circuitry which is provided specifically for use with the VIR signal is not used in the event that the transmitted composite color video signal does not include the VIR signal. This means that the hue and saturation control circuitry either is inhibited or must remain idle during broadcasts which do not include the VIR signal. Consequently, the preferred color control which is achieved by the circuitry used with the VIR signal is not utilized advantageously in the absence of such a reference signal.

OBJECTS OF THE INVENTION

Therefore, it is an object of the present invention to provide improved color television receiving apparatus which is responsive to and utilizes a transmitted VIR signal for controlling the color characteristics of a reproduced color picture.

Another object of this invention is to provide improved color television receiving apparatus which is responsive to a transmitted VIR signal and which also provides a manual adjustment to enable the viewer to selectively adjust the reproduced color picture in accordance with his own particular preferences.

A further object of this invention is to provide color control circuitry which can be used in a color television receiving apparatus whether or not a transmitted composite color video signal includes a VIR signal.

An additional object of this invention is to provide hue and saturation control circuitry for use in a color television receiving apparatus, this circuitry being responsive to a transmitted VIR signal and also being utilized in the event that a VIR signal is not transmitted; and which includes the additional feature of permitting manual adjustment such that the hue and saturation characteristics of the reproduced video picture may differ from the standards represented by the VIR signal.

Various other objects, advantages and features of the present invention will become readily apparent from the ensuing detailed description, and the novel features will be particularly pointed out in the appended claims.

SUMMARY OF THE INVENTION

In accordance with the present invention, color television receiving apparatus is provided for receiving and demodulating a composite color television signal having horizontal synchronizing signals, color burst signals and luminance and chrominance components, the composite color television signal being of the type which additionally may or may not include a VIR signal provided in a predetermined line interval during the vertical retrace interval. This apparatus includes a demodulator for demodulating the chrominance component, separated from the composite color television signal, into color signal components; a signal generator for generating a signal, such as a gate signal, during the predetermined line interval in which the VIR signal is expected; control circuitry energized by the generated signal and responsive to a selected component produced by the demodulator during the predetermined line interval for producing a signal to control the color signal components demodulated by the demodulator during the remaining line intervals; and a manual adjustment coupled to the control circuitry for selectively varying the signals produced by the control circuitry in accordance with an operator's preference for particular hue and/or saturation characteristics of the reproduced color video picture. In accordance with another aspect of this invention, a second generated signal, such as a second gate signal, is generated during the intervals that the color burst signals are received; and a switching circuit receives the first and second generated signals and selectively supplies one of them to the control circuitry depending upon whether or not the transmitted composite color television signal includes a VIR signal.

BRIEF DESCRIPTION OF THE DRAWINGS

The following detailed description, given by way of example, will best be understood in conjunction with the accompanying drawings in which:

FIG. 1 is a graphic representation of a proposed VIR signal to be transmitted in a composite color television signal;

FIG. 2 is a block diagram of one embodiment of color television receiving apparatus which utilizes this VIR signal; and FIG. 3 is a schematic diagram of various blocks which are included in the apparatus shown in FIG. 2.

DETAILED DESCRIPTION OF A PREFERRED EMBODIMENT

Before describing the color television receiving apparatus which advantageously utilizes the VIR signal, the VIR signal itself first will be considered. As mentioned above, it has been proposed that this VIR signal be transmitted during line 19 of the composite television signal. However, it could be transmitted during a different line interval, such as line 20, or on both lines 19 and 20 so as to be included in both fields. As shown in FIG. 1, the line interval during which the VIR signal is transmitted includes the normal blanking and horizontal synchronizing pulses as well as the color burst signal. The levels of the different components shown in FIG. 1 are expressed in IRE units wherein the difference between the blanking level and zero carrier is 100 units. The horizontal synchronizing pulse is shown as a negative pulse of 40 units amplitude, and this pulse is followed by the burst signal 1 provided on the blanking or pedestal level of 0 units. As is conventional, burst signal 1 is sinusoidal whose frequency is equal to the subcarrier frequency of 3.58 MHz. Typically, the burst signal is present for approximately eight cycles. The peak-to-peak amplitude of this burst signal is 40 units and its phase is coincident with the $-(B-Y)$ axis.

Approximately $12\mu$ sec after the beginning of this VIR signal is the chrominance reference 2 which has the same phase as the burst signal, that is, coincident with the $-(B-Y)$ axis, and is formed of the unmodulated subcarrier frequency 3.58 MHz. This chrominance reference portion is provided on a level of 70 units and exists for a duration of approximately $24\mu$ sec. Following this chrominance reference portion, a luminance reference level 3 of 50 units is provided for $12\mu$ sec which, in turn, is followed by a black reference level 4 having a level of 7.5 units and extending for $12\mu$ sec. The approximate duration from the start of the horizontal synchronizing pulse to the termination of the black reference level is $60\mu$ sec.

Turning now to FIG. 2, there is illustrated a block diagram of one embodiment of color television receiving apparatus which produces individual color signals (R, G, B) for controlling a color picture tube to reproduce a color television picture. The illustrated apparatus is adapted to receive the chrominance component included in the composite color television signal, the luminance component and signals derived from the horizontal synchronizing signal. Conventional circuitry (not shown) is provided to separate the chrominance component, luminance component and horizontal synchronizing signals from the received composite color television signal, and to apply them to terminals 5, 16 and 10, respectively, illustrated in FIG. 2. The apparatus shown herein is comprised of a band pass amplifier 6, a level-control circuit 7, a demodulator 8, an oscillator 13, a matrix circuit 15 and hue and saturation control circuits. Band pass amplifier 6 is coupled to terminal 5 to receive the chrominance component separated from the transmitted composite color television signal. The band pass amplifier is a gain-controlled amplifier having a gain control terminal coupled to a level detector 12. The output of this band pass amplifier, which includes the chrominance component as well as the burst signal, is coupled to demodulator 8 through level control circuit 7 and, additionally, to a burst gate 9.

Burst gate 9 is adapted to separate the burst signal from the chrominance component provided at the output of band pass amplifier 6. For this purpose, burst gate 9 includes a gate control coupled to terminal 10 to receive a gate signal that is derived from the horizontal synchronizing signal. As an example, this gate signal may be the horizontal synchronizing signal delayed by a suitable amount to coincide with burst signal 1 shown in FIG. 1. The output of burst gate 9 is coupled to a ringing amplifier 11 which includes a resonant circuit whose resonance frequency is equal to the burst signal frequency, i.e., the 3.58 MHz. subcarrier. Thus, ringing amplifier 11 is responsive to the burst signal to produce an oscillating signal that is synchronized with the burst signal and that has an amplitude level proportional to the amplitude of the separated burst signal. This output of this ringing amplifier is coupled to level detector 12 which is adapted to detect the level of the ringing signal, that is, of the separated burst signal, and to control the gain of band pass amplifier 6 in response thereto. Thus, the control circuit formed of burst gate 9, ringing amplifier 11 and level detector 12 functions as an automatic color control circuit (ACC). This ACC circuit is capable of controlling the gain of band pass amplifier 6 so as to compensate for amplitude changes in the received composite color television signal, which amplitude changes are reflected in level variations of the burst signal. Thus, the chrominance component produced at the output of band pass amplifier 6 will exhibit the proper signal levels.

The output of ringing amplifier 11 is coupled to oscillator 13 for synchronizing that oscillator with the frequency and phase of the received burst signal. Oscillator 13 produces a local oscillating signal which is supplied through a controllable phase shifter 14 to demodulator 8 for demodulating the color signal components from the chrominance component which is applied to the demodulator from level control circuit 7. In this regard, demodulator 8 is conventional and produces the respective color-difference signals R-Y, G-Y and B-Y on individual outputs, as illustrated. These color difference signals are applied to matrix 15 together with the separated luminance component Y which is applied to terminal 16, for producing the respective color signals R, G and B which are used to control the color picture tube for reproducing the color video picture corresponding to the received composite color television signal.

The hue or tint of a reproduced color television picture is dependent upon the phase of the local oscillating signal which is used to demodulate the received chrominance component. In the composite color television signal, the phase of the burst signal is coincident with the −(B-Y) axis. With this precise phase relation, demodulator 8 is capable of producing accurate color difference signals by demodulating the chrominance component. If the phase of the local oscillating signal differs from its proper phase alignment, the relative levels of the (R-Y), (G-Y) and (B-Y) color difference signals vary from the correct relative levels. This, in turn, affects the hue of the reproduced television picture. As is also known, the magnitude of the chrominance component supplied to demodulator 8 determines the saturation levels of the respective color signals. Phase-shifter 14 is provided for controlling the phase of the local oscillating signal, and thus the hue characteristics of the reproduced picture; and level control circuit 7 is provided for adjusting the magnitude of the chrominance component, and thus the saturation of the color picture. The hue control circuit is adapted to control phase-shifter 14; and the saturation control circuit is adapted to control level control circuit 7.

As mentioned above, chrominance reference portion 2 (FIG. 1) of the VIR signal consists of a subcarrier whose phase is coincident with the −(B-Y) axis. Since the (R-Y) and (B-Y) color difference components exhibit phase quadrature, the (R-Y) component produced by demodulator 8 in response to the VIR signal ideally should be of zero level, and the (B-Y) component produced by the demodulator in response to the VIR signal will have a predetermined negative amplitude because of the phase of the subcarrier. The hue control circuit is adapted to sense the (R-Y) level when the VIR signal is received and to control phase-shifter 14 so as to vary the phase of the local oscillating signal such that the (R-Y) component corresponds to its proper level. Similarly, the saturation control circuit is adapted to detect the level of the (B-Y) component produced when the VIR signal is received, and to control level control circuit 7 such that the amplitude of the chrominance component applied to demodulator 8 corresponds to the proper saturation level. In the illustrated embodiment, the hue control circuit and the saturation control circuit also are capable of controlling phase-shifter 14 and level control circuit 7, respectively, in accordance with the burst signal included in the received composite color television signal in the event that this composite color television signal is not provided with a VIR signal. Still further, the hue control circuit and the saturation control circuit are provided with manual adjustments such that an operator, or viewer, can select preferred hue and saturation characteristics that may differ from the optimum standard levels established by the transmitted VIR and burst signals.

The hue control circuit is comprised of a sampling circuit 20 having a sampling signal input, a color component input coupled to demodulator 8 for receiving the (R-Y) component, a reference signal input $20_s$ adapted to receive a reference signal produced by a manually adjustable signal generator, and an output which supplies a control signal to phase-shifter 14. The saturation control circuit is similar to the hue control circuit in that it is comprised of a sampling circuit 21 having a sampling signal input to which a suitable sampling signal is applied, as described below, a signal input terminal coupled to demodulator 8 for receiving the (B-Y) component, a reference signal input $21_s$ for receiving a reference signal produced by a manually adjustable signal generator and an output terminal for supplying a control signal to level control circuit 7. The sampling signals applied to sampling circuits 20 and 21 are selectively determined by a switching circuit 19. This switching circuit is illustrated as a movable contact 19a selectively engageable with fixed contacts 19b and 19c, respectively. A gate signal generated by a VIR gate signal generator 17 is applied to fixed contact 19b and another gate signal, such as the burst gate signal, is applied to fixed contact 19c from terminal 10. Depending upon the particular contact with which movable contact 19a is engaged, either the VIR gate signal or the burst gate signal is supplied as the sampling signal to sampling circuits 20 and 21. As is apparent from FIG. 1, the burst gate signal may be derived from the received horizontal synchronizing signal by imparting a suitable delay to that signal. VIR gate signal generator 17 is adapted to generate a periodic gating signal whose duration is at least coextensive with that of chrominance reference component 2 and which is generated during each VIR signal interval, that is, during each nineteenth line of the received composite color television signal. The particular construction of VIR gate signal generator 17 forms no part of the present invention per se, and it may be comprised of a counting circuit that counts the horizontal synchronizing pulses in the received composite color television signal so as to generate an output gating signal at the proper time, that is, during the nineteenth line interval.

Switching circuit 19 is controlled by a VIR detector, described in greater detail hereinbelow with respect to FIG. 3. This VIR detector may comprise a sampling circuit having a sampling signal input coupled to VIR gate signal generator 17 and a signal input coupled to demodulator 8 to receive the (B-Y) component. If the VIR signal is present in the transmitted composite color television signal, then the (B-Y) component produced by demodulator 8 will exhibit a predetermined level at the time that the VIR gate signal is produced. Conversely, if the VIR signal is not transmitted, the (B-Y) component will not exhibit this level. VIR detector 18 is adapted to sense the level of the (B-Y) component during the expected VIR interval, and controls the condition of switching circuit 19 accordingly. That is, if the VIR signal is present, movable contact 19a is controlled to be in engagement with contact 19b; and, conversely, if the VIR signal is not transmitted, the movable contact is controlled to be in engagement with contact 19c.

In operation, let it be assumed that the composite color television signal is transmitted with substantially no distortion. Let it be further assumed that the reference signal applied to reference terminal $20_s$ of sampling circuit 20 is equal to the optimum standard level and that the reference signal applied to reference terminal $21_s$ of sampling circuit 21 also is equal to the optimum standard level. After being separated from the composite signal, the chrominance component is applied to terminal 5 and, through band pass amplifier 6, to level control circuit 7 for application to demodulator 8. Also, the received horizontal synchronizing signal is separated and suitably delayed to coincide with the burst signal. Accordingly, burst gate 9 extracts the burst signal from the chrominance component and, through ringing amplifier 11 and detector 12, the level of the extracted burst signal is detected to control the gain of band pass amplifier 6 in accordance with conventional ACC operation.

Let it be further assumed that the received color television signal includes the VIR signal, such as shown in FIG. 1. During the VIR interval, demodulator 8 demodulates chrominance reference component 2 (FIG. 1) in response to the local oscillating signal supplied by oscillator 13 to produce the (R-Y), (G-Y) and (B-Y) color signal components. Since it has been assumed that the composite color television signal has been transmitted with substantially no distortion, it is expected that the (R-Y) component will be of substantially zero level since the signal applied to demodulator 8 from band pass amplifier 6 is coincident with the −(B-Y) axis at this time. For the same reason, it is expected that the (B-Y) component will have a negative predetermined level. VIR detector 18 is energized only when the VIR gate signal is produced by VIR gate signal generator 17, such that the VIR detector senses, in this instance, that the VIR signal has been transmitted. Accordingly, VIR detector 18 controls switching circuit 19 to engage movable contact 19a with fixed contact 19b. Hence, the VIR gate signal produced by VIR gate signal generator 17 is applied through switching circuit 19 to sampling circuits 20 and 21.

The (R-Y) component produced by demodulator 8 during the VIR signal interval is sampled by the VIR gate signal supplied through switching circuit 19 to sampling circuit 20 and is compared in the sampling circuit with the optimum reference level supplied to reference terminal $20_s$. Since it has been assumed that the composite color television signal is transmitted with substantially no distortion, the (R-Y) component is substantially equal to the reference signal. Hence, phase-shifter 14 is suitably controlled and, in this assumed example, its phase need not be adjusted.

Similarly, the VIR gate signal produced by VIR gate signal generator 17 is supplied through switching circuit 19 to sampling circuit 21 which samples the (B-Y) component produced during this interval. This sampled component is compared to the optimum reference level applied to reference terminal $21_s$, and the difference therebetween is used to control level control circuit 7. In the assumed example, the sampled (B-Y) component is substantially equal to the optimum standard level, and level control 7 need not be adjusted.

It is readily apparent that if the phase of the local oscillating signal produced by oscillator 13 differs from the phase of chrominance reference component 2 (FIG. 1), then the (R-Y) component produced by demodulator 8 during the VIR interval will differ from the reference level applied to reference terminal $20_s$. This difference is supplied by sampling circuit 20 as a control signal to correspondingly adjust the phase of the local oscillating signal as established by phase-shifter 14. This adjustment in the phase-shift of the local oscillating signal compensates for the difference between the demodulated (R-Y) component and the reference level applied to terminal $20_s$. Similarly, if, because of distortion in the transmitted composite color video signal, the demodulated (B-Y) component differs from the reference level applied to reference terminal $21_s$, then the control signal produced by sampling circuit 21 adjusts level control circuit 7 to correspondingly adjust the level of the chrominance component to compensate for this difference. In this manner, distortions in the transmitted composite color television signal are compensated such that the phase of the local oscillating signal produced by oscillator 13 and the chrominance component level determined by level control circuit 7 are maintained in accordance with the desired reference level, such as the optimum hue and saturation levels, applied to reference terminals $20_s$ and $21_s$, respectively.

If the received composite color television signal does not include the VIR signal, the (B-Y) component produced by demodulator 8 during the VIR interval, as detected by VIR detector 18 in response to VIR gate signal generator 17, is not equal to the aforementioned negative predetermined level. Consequently, VIR detector 18 controls switching circuit 19 such that contact 19a engages contact 19c. In this condition, the delayed horizontal synchronizing signal is supplied from terminal 10 through switching circuit 19 to sampling circuits 20 and 21. This means that the (R-Y) component produced by demodulator 8 at the time that burst signal 1 (FIG. 1) is received is compared to the reference signal applied to reference terminal $20_s$; and, similarly, the (B-Y) component produced by demodulator 8 at the time that burst signal 1 is received is compared to the reference signal applied to reference terminal $21_s$. If the composite color television signal is not subjected to transmission distortions, the sampled (R-Y) and (B-Y) components will be substantially equal to the reference signals applied to reference terminals $20_s$ and $21_s$, respectively, such that phase-shifter 14 and level control circuit 7 will be maintained at their proper values. In the event of transmission distortions, the control signal produced by sampling circuits 20 and 21 will control phase-shifter 14 and level control circuit 7 to adjust the phase of the local oscillating signal and the magnitude of the chrominance component, respectively, to compensate for such distortions. That is, the respective sampling circuits operate in substantially the same way both when the VIR signal is present and when the composite color television signal is transmitted without such a VIR signal. The only difference in the operation of these sampling circuits is the particular time at which they are energized by the sampling signal supplied by switching circuit 19 to sample the (R-Y) and (B-Y) components.

Referring now to FIG. 3, a circuit diagram of VIR detector 18, switching circuit 19, and sampling circuits 20 and 21 is shown. Input terminals 10 and 17a are provided to receive the burst gate signal and VIR gate signal, respectively, described above with respect to FIG. 2. Input terminal 10 is coupled via one signal path through a diode 19g to a output terminal of switching circuit 19; while input terminal 17a is coupled via another signal path through a diode 19f to the output terminal of the switching circuit. Each of these signal paths is coupled to a respective switching transistor 19d and 19e, respectively, these transistors being selectively energized to shunt or by-pass its associated signal path, as will be described. Thus, if transistor 19d is energized to be conductive, the anode of diode 19g is coupled to ground through transistor 19d, thereby inhibiting a signal applied to this input terminal from being transmitted to the output terminal of the switching circuit. Similarly, if transistor 19e is energized to be conductive, the anode of diode 19f is coupled to ground through this transistor, thereby inhibiting a signal applied to input terminal 17a from being transmitted to the output terminal of switching circuit 19.

Transistors 19d and 19e are selectively energized by VIR detector 18. VIR detector 18 is comprised of a sample-and-hold circuit comprised of transistors 18a and 18b and capacitor 18d; and a differential amplifier comprised of transistors 18i and 18h. Transistor 18a is connected as an emitter-follower having its base electrode coupled to receive the (B-Y) component produced by demodulator 8 and its emitter electrode coupled to the collector of transistor 18b. The base electrode of transistor 18b is coupled through a base resistor 18c to input terminal 17a so as to receive the VIR gate signal generated by VIR gate signal generator 17. When the VIR gate signal is produced, transistor 18b is conductive to transmit the signal applied to its collector electrode to its emitter electrode. The emitter electrode of this transistor is coupled to capacitor 18d whereat the aforementioned transmitted signal is stored. Thus, when the VIR gate signal is applied to input terminal 17a, transistor 18b samples the signal applied to its collector electrode, and this sampled signal is stored across capacitor 18d.

The signal stored across capacitor 18d is applied to the base electrode of transistor 18i, and a reference signal is applied to the base electrode of transistor 18h. This reference signal is derived from a voltage divider formed of resistors 18e, 18f and 18g, resistor 18f preferably being a variable resistor, such as a potentiometer.

Before describing sampling circuits 20 and 21, the operation of VIR detector 18 and the manner in which it controls switching circuit 19 now will be described. It is recalled that the (B-Y) component produced by demodulator 8 and applied to transistor 18a is of a predetermined magnitude of negative polarity when the VIR signal is received. If the transmitted composite color television signal is not provided with the VIR signal, then the (B-Y) component produced by the demodulator is of positive polarity and a different magnitude. Let it be assumed that transistor 18a is suitably biased such that it supplies both the positive and negative (B-Y) components to transistor 18b. Accordingly, when the VIR gate signal is applied to input terminal 17a, transistor 18b is rendered conductive so as to charge capacitor 18d to the (B-Y) signal level of corresponding polarity. Let it be further assumed that the potential applied to the base electrode of transistor 18h by the resistor voltage divider is less than the voltage to which capacitor 18d is charged when the transmitted composite color television signal does not include the VIR signal. This potential also is selected to be greater than the voltage to which capacitor 18d is charged when the transmitted composite color television signal is provided with the VIR signal.

Thus, if the VIR signal is present, transistor 18h is rendered conductive and transistor 18i is non-conductive. Hence, the collector potential of transistor 18i is sufficient to energize transistor 19d to its conductive state, thereby shunting the signal path from input terminal 10 to ground. At this time, the collector potential of conducting transistor 18h is not sufficient to energize transistor 19e. Consequently, the VIR gate signal is transmitted from input terminal 17a through diode 19f to the output terminal of switching circuit 19. Conversely, if the VIR signal is not present, capacitor 18d is charged to a level that renders transistor 18i conductive while transistor 18h is non-conductive. In this condition, the collector potential of transistor 18i now is not sufficient to energize transistor 19d; but the collector potential of transistor 18h is sufficient to render transistor 19e conductive. Hence, the signal path from input terminal 17a is shunted to ground via transistor 19e. Accordingly, the burst gate signal applied to input terminal 10 is transmitted via diode 19g to the output terminal of switching circuit 19.

Thus, it is seen how VIR detector 18 controls switching circuit 19 to selectively couple either the VIR gate signal or the burst gate signal to the switching circuit output terminal.

Sampling circuits 20 and 21 are of similar construction and, in the interest of brevity, only sampling circuit 20 will be described. The only difference between the illustrated sampling circuits is that sampling circuit 20 is provided with the (R-Y) component produced by demodulator 8 while sampling circuit 21 is provided with the (B-Y) component. Also, the output terminal of sampling circuit 20 is coupled to phase-shifter 14, while the output terminal of sampling circuit 21 is coupled to level control 7. In all other respects, these sampling circuits are substantially identical. Sampling circuit 20 is comprised of transistors 20a and 20d, interconnected in a manner quite similar to the interconnection between transistors 18a and 18b, described above. Sampling circuit 20 additionally includes a storage capacitor 20c which is adapted to store the signal sampled by transistors 20a and 20d. Capacitor 20c is connected as a feedback capacitor from the output terminal of an operational amplifier 20b to its inverting input terminal. The non-inverting input terminal of operational amplifier 20b is supplied with an adjustable reference signal produced by a manually operable reference signal generator comprised of a resistive voltage divider including an adjustable resistor 20e, such as a potentiometer. As is conventional, operational amplifier 20b is a high gain amplifier which amplifies the difference between the signals applied to its inverting and non-inverting inputs. The amplified output of this amplifier is of opposite phase with respect to the signal applied to its inverting input. In the illustrated configuration, amplifier 20b is connected as a differential integrator. This illustrated circuit also is known as the so-called mirror integrating circuit. As such, the output voltage produced by amplifier 20b and applied to sampling circuit output terminal 20f is linearly related to the input, or sampled voltage. Since the gain of operational amplifier 20b is high, capacitor 20c can store the voltage sampled by transistors 20a and 20d for a relatively long time interval. Thus, for the purpose of sampling the (R-Y) component during the VIR interval, that is, at the predetermined line interval during each vertical retrace period, the sampled voltage across capacitor 20c will be stored with good fidelity and linearity.

When the VIR or burst gate signal provided at the output terminal of switching circuit 19 energizes transistor 20d, capacitor 20c will be charged to the level of the (R-Y) component applied to transistor 20a. The charging time constant is determined by the capacitance of capacitor 20c and the forward resistance of transistor 20d. If the next-sampled (R-Y) component is less than the previously sampled and stored (R-Y) component, then capacitor 20c will discharge through transistor 20d when that transistor is rendered conductive by the gate signal applied thereto by switching circuit 19. Stated otherwise, capacitor 20c will, in this instance, be charged to a lower level than that to which it previously had been charged. Hence, it is desirable that the forward resistance of transistor 20d, which determines the charging time constant of capacitor 20c, be equal to its reverse resistance, which is used for discharging capacitor 20c. This would mean that the charge and discharge time constants of the capacitor are equal.

Variable resistor 20e is manually adjustable by a viewer to modify the output signal of amplifier 20b applied to output terminal 20f. That is, since the output signal produced by amplifier 20b is proportional to the difference between the sampled (R-Y) component stored by capacitor 20c and the reference signal applied by variable resistor 20e, adjustment of this resistor results in a corresponding change in the output signal, whereby phase-shifter 14 is correspondingly controlled. Thus, if resistor 20e is adjusted to correspond to an optimum standard hue level, then the control signal applied to phase-shifter 14 by amplifier 20b will adjust the phase of the local oscillating signal to result in a color television picture which exhibits this optimum standard hue. However, if a viewer adjusts resistor 20e to a preferred level, which may differ from the optimum standard hue level, then phase-shifter 14 will be correspondingly controlled such that the reproduced color television picture will exhibit the preferred hue characteristics.

A similar manual adjustment to variable resistor 21e will result in a corresponding control signal applied to level control 7 by amplifier 21b such that the saturation level of the reproduced color television picture is in accordance with this adjustment. Therefore, depending upon the selective adjustments of resistors 20e and 21e, the displayed color television picture will exhibit either optimum standard hue and/or saturation characteristics or particular hue and/or saturation characteristics that are in accord with the viewer's preference.

While the present invention has been particularly shown and described with respect to a preferred embodiment, it should be readily apparent that various changes and modifications in form and details can be made by one of ordinary skill in the art without departing from the spirit and scope of the invention. Accordingly, it is intended that the appended claims be interpreted as including all such changes and modifications.

What is claimed is:

1. Color television receiving apparatus for receiving and demodulating a composite color television signal including horizontal synchronizing signals, color burst signals, a luminance component and a chrominance component, said composite color television signal being of the type which additionally may include a VIR signal provided in a predetermined line interval during the vertical retrace interval, said apparatus comprising means for separating and demodulating said chrominance component into color signal components; first signal means for providing a VIR gate pulse during the predetermined line interval in which said VIR signal is provided; second signal means for providing a burst gate pulse which is time coincident with said color burst signals that are received; switch means for receiving both said VIR gate pulse and said burst gate pulse and for selectively supplying one of said received gate pulses to an output thereof; VIR detecting means coupled to said demodulating means and to said first signal means, said VIR detecting means including a sampling circuit responsive to said VIR gate pulse to sample a selected one of said color signal components for producing a switch control signal as a function of said sampled color signal component if said VIR signal is present, said switch means being coupled to and controlled by the switch control signal produced by said VIR detecting means for supplying said VIR gate pulse to its output if said VIR signal is present and for supplying said burst gate pulse to its output if said composite color television signal does not include said VIR signal; sampling means coupled to said switch means and to said demodulating means and responsive either to said VIR gate pulse or to said burst gate pulse, as supplied by said switch means, to sample selected components produced by said demodulating means; control means responsive to said sampled selected components for controlling the hue and/or saturation characteristics of the demodulated color signal components; and manually operable adjusting means coupled to said sampling means for selectively varying the signals produced by said sampling means in accordance with an operator's preference for particular hue and/or saturation characteristics of a color video picture reproduced from said demodulated color signal components.

2. The apparatus of claim 1 wherein said switch means comprises a first input for receiving said VIR gate pulse; a second input for receiving said burst gate pulse; an output; a first signal path for coupling said first input to said output; a second signal path for coupling said second input to said output; first inhibit means coupled to said first signal path and energized for inhibiting said VIR gate pulse from being coupled to said output when said VIR detecting means detects the absence of a VIR signal; and second inhibit means coupled to said second signal path and energized for inhibiting said burst gate pulse from being coupled to said output when said VIR detecting means detects the presence of said VIR signal.

3. The apparatus of claim 2 wherein said VIR signal comprises a subcarrier signal whose phase is in predetermined alignment with the axis of a particular one of said color signal components and whose amplitude is of a predetermined level; and wherein the sampling circuit of said VIR detecting means has a signal input coupled to said demodulating means to receive the color signal component with which said subcarrier signal is in predetermined alignment, a sampling input for receiving said VIR gate pulse and an output for producing a sampled level of said received color signal component, and comparison means for comparing said sampled level to a predetermined level to selectively energize said first and second inhibit means in accordance with the comparison.

4. The apparatus of claim 3 wherein said comparison means comprises a differential amplifier including a first input supplied with said sampled level and a second input supplied with said predetermined level, and a first output coupled to said first inhibit means and a second output coupled to said second inhibit means.

5. The apparatus of claim 4 wherein the level of said color signal component with which said subcarrier signal is in predetermined alignment and which is demodulated by said demodulating means when said VIR signal is received is less than said predetermined level, such that said differential amplifier energizes said second inhibit means when said composite color television signal includes said VIR signal and energizes said first inhibit means when said composite color television signal does not include said VIR signal.

6. The apparatus of claim 3 wherein said demodulating means is supplied with a local oscillating signal substantially equal in frequency and phase to said subcarrier signal; and said control means comprises phase shift means for selectively shifting the phase of said oscillating signal supplied to said demodulating means and level control means for selectively controlling the level of said chrominance component applied to said demodulating means, as a function of the sampled components produced by said sampling means.

7. The apparatus of claim 6 wherein said adjusting means comprises means for generating manually variable reference signals; comparator means for comparing the sampled components produced by said sampling means to said variable reference signals; and means for applying control signals to said phase shift means and to said level control means in accordance with said comparison of said sampled components to said variable reference signals.

8. The apparatus of claim 7 wherein said sampling means comprises first and second sampling circuits for sampling first and second components produced by said demodulating means; said means for generating variable reference signals comprises first and second variable signal generators for generating first and second reference signals; and said comparator means comprises first storage means coupled to said first sampling circuit and to said first variable signal generator for storing a first control signal proportional to the difference between the first sampled component and said first reference signal, and second storage means coupled to said second sampling circuit and to said second variable signal generator for storing a second control signal proportional to the difference between the second sampled component and said second reference signal.

9. The apparatus of claim 8 wherein said first and second storage means each comprises a differential integrator, the output of the first differential integrator being applied as a control signal to said phase shift means and the output of the second differential integrator being applied as a control signal to said level control means.

10. The apparatus of claim 1 wherein said demodulating means is supplied with a local oscillating signal substantially equal in frequency and phase to said subcarrier signal for producing at least the red (R-Y) and blue (B-Y) color difference signals; said control means comprises phase shift means for selectively shifting the phase of said oscillating signal supplied to said demodulating means to adjust the hue characteristics of the demodulated color difference signals, and level control means for selectively controlling the level of said chrominance component applied to said demodulating means to adjust the saturation characteristics of the demodulated color difference signals; and said sampling means comprises a first switching transistor coupled to said switch means and responsive to said VIR or burst gate pulses for coupling the red (R-Y) color difference signal therethrough, a first differential integrator having first and second inputs, said first input being connected to said first switch transistor to receive said red (R-Y) color difference signal and said second input being connnected to said manually operable adjusting means to receive a first d.c. level, said first differential integrator supplying a phase shift control signal to said phase shift means as a function of the difference between said red (R-Y) color difference signal and said first d.c. level, a second switching transistor coupled to said switch means and responsive to said VIR or burst gate pulses for coupling the blue (B-Y) color difference signal therethrough, and a second differential integrator having first and second inputs, said first input being connected to said second switching transistor to receive said blue (B-Y) color difference signal and said second input being connected to said manually operable adjusting means to receive a second d.c. level, said second differential integrator supplying a level control signal to said level control means as a function of the difference between said blue (B-Y) color difference signal and said second d.c. level.

11. The apparatus of claim 2 wherein said first signal path comprises a diode connected between said first input and said output; said second signal path comprises a diode connected between said second input and said output; said first inhibit means comprises a first transistor whose collector-emitter circuit is connected in shunt relation to said first input, said first transistor being rendered conductive when said VIR detecting means detects the absence of a VIR signal; and said second inhibit means comprises a second transistor whose collector-emitter circuit is connected in shunt relation to said second input, said second transistor being rendered conductive when said VIR detecting means detects the presence of a VIR signal.

* * * * *